Aug. 20, 1957 J. J. SHAW 2,803,271
COMBINATION TABLE AND MITER GUIDE FOR PORTABLE POWER SAWS
Filed Feb. 27, 1956 2 Sheets-Sheet 1

INVENTOR.
James J. Shaw.
BY
ATTORNEYS.

Aug. 20, 1957 — J. J. SHAW — 2,803,271
COMBINATION TABLE AND MITER GUIDE FOR PORTABLE POWER SAWS
Filed Feb. 27, 1956 — 2 Sheets-Sheet 2
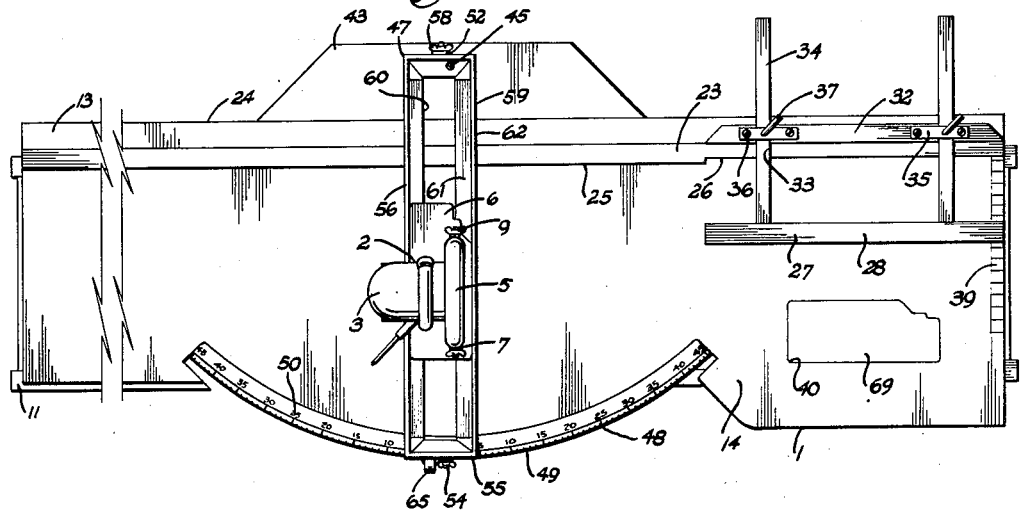
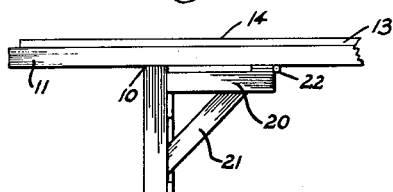
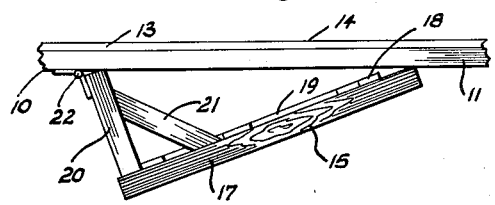
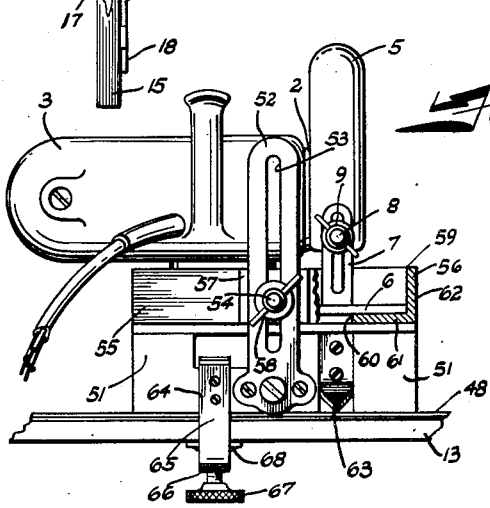
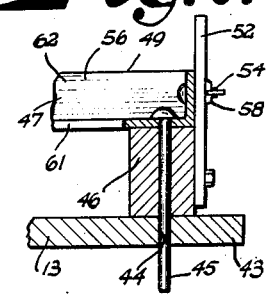
INVENTOR.
James J. Shaw.
BY
Fishburn and Gold
ATTORNEYS.

United States Patent Office 2,803,271
Patented Aug. 20, 1957

2,803,271

COMBINATION TABLE AND MITER GUIDE FOR PORTABLE POWER SAWS

James J. Shaw, Melbourne, Mo.

Application February 27, 1956, Serial No. 567,831

3 Claims. (Cl. 143—6)

This invention relates to tables for use of electrically driven portable power saws for sawing boards and the like, and more particularly to a combination table for use of portable power saws as ordinary circular saws and/or guiding such saws in cutting miters.

Portable power saws are commonly used for rough work at building sites, but their uses are limited by the devices used in supporting the boards to be sawed. It is common practice for carpenters to move relatively heavy tables with permanently mounted circular saws and driving motors thereon for ripping of boards, portable power saws for rough cut of work, and hand saws with miter boxes for accurate angle cuts. This practice requires a relatively large investment in tools that are idle during a substantial portion of the work as well as the extra time for moving and setting up of the necessary equipment at the building site.

The objects of the present invention are to provide a table that is relatively light weight, easily transported and erected and that is quickly converted from use of a portable power saw as a circular saw to a miter cutting saw; to provide such a table wherein the miter guide normally does not interfere with use of the power saw as a circular saw; to provide such a table with a swingably mounted miter guide and a rip fence selectively adjustable on the table in spaced relation to the arc of movement of the miter guide; to provide such a table with a miter guide that is adjustable for cutting boards of varying thicknesses; to provide a miter guide pivot in line with the plane of the saw blade moved in said guide for accurate positioning; to provide such a table with collapsible legs for ease of transportation, erection and storage; and to provide a combination table and miter guide for portable power saws that is economical to manufacture, and efficient in operation for making of accurate saw cuts.

In accomplishing these and other objects of the present invention, I have provided improved details of structure, the preferred form of which is illustrated in the accompanying drawings, wherein:

Fig. 3 is a plan view of the combination table and miter guide.

Fig. 4 is a partial elevational view illustrating the position of the legs when in erected position.

Fig. 5 is a partial elevational view illustrating the position of the legs when in folded position.

Fig. 6 is an enlarged detail elevational view illustrating the structure for adjusting the heighth of the miter guide above the table top.

Fig. 7 is an enlarged vertical sectional view through the pivotal connection of the guide arm and table extension.

Figure 1:
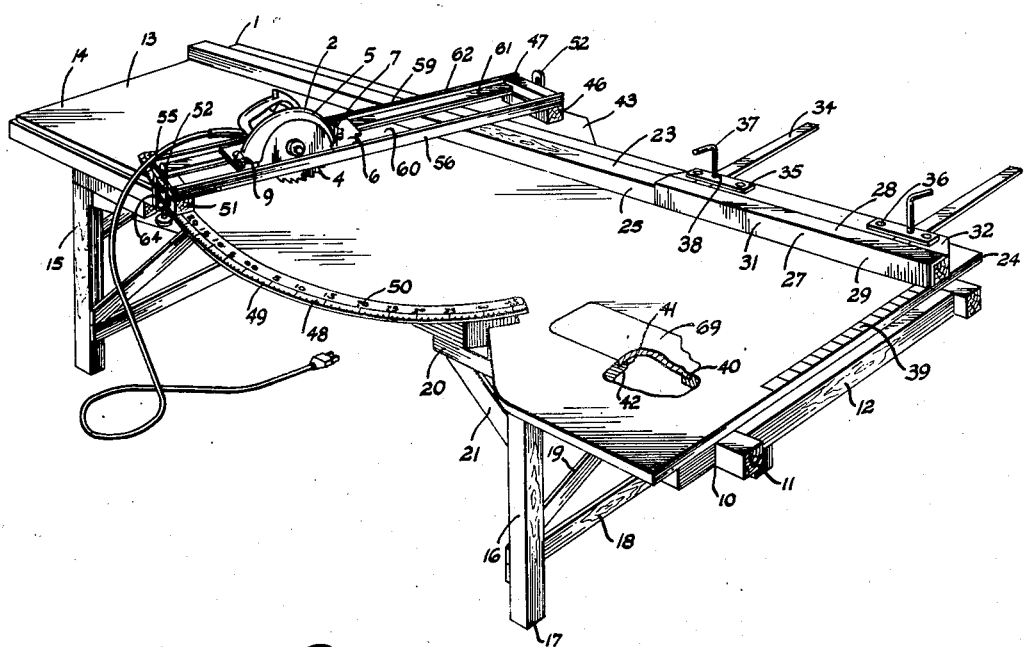
Fig. 1 is a perspective view of the combination table and miter guide with a portable power saw positioned in the guides for cutting miters.
Figure 2:
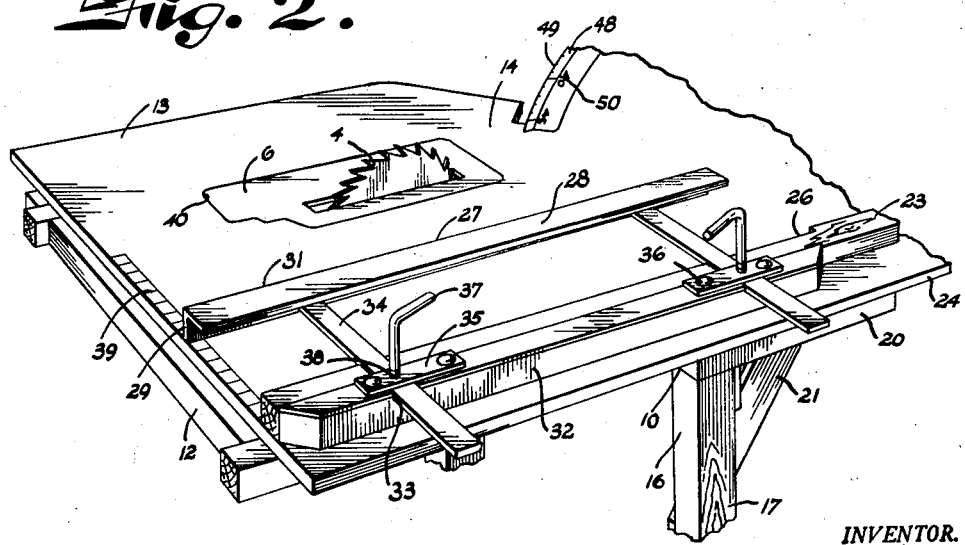
Fig. 2 is a partial perspective view of the table with the power saw positioned therein for use as a circular saw.

Referring more in detail to the drawings:

1 generally designates a combination table and miter guide for portable power saws 2. The portable power saw 2 is preferably a conventional type electrically-driven hand saw and includes a motor housing 3 enclosing the motor for driving a saw blade or disc 4, a guard 5 being fixed to the motor housing 3 and extending about a portion of the saw disc 4. A base 6 of the saw is substantially a flat plate having a slot therein through which the saw disc extends, the base 6 being adjustably mounted on the guard 5 for movement toward and away from the axis of rotation of the saw disc for varying the distance the saw disc extends below the base 6. In the illustrated structure, the base 6 has slotted ears 7 extending upwardly therefrom with studs 8 on the guard extending through the slots of the ears 7 and wing nuts 9 threaded on the studs 8 to clamp the base in selected position relative to the guard to provide the desired depth that the saw disc 4 will cut below the base 6.

The table 1 includes a frame 10 having connected longitudinal members 11 and transverse members 12 to form a rigid structure, a flat table top 13 being suitably secured to said frame 10 to provide a substantially horizontal work surface 14 on the upper face thereof. The frame 10 is provided with pairs of legs 15 and 16 hingedly mounted thereon for folding for transportation and storage. Each pair of legs consists of spaced posts 17 connected by cross members 18 and bracing 19, the cross members and bracing extending substantially transversely of the frame 10. The upper ends of the posts 17 are connected to arms 20 extending substantially longitudinally of the table from the posts 17 and at an angle of slightly more than 90 degrees relative to said posts, bracing 21 connecting the arms 20 and posts 17 to provide a rigid structure. The ends of the arms 20 remote from the posts 17 are swingably connected to the longitudinal members 11 of the frame 10 by means of hinges 22 whereby the pairs of legs may be swung to folded position relative to the table top as illustrated in Fig. 5. When in erected position as illustrated in Fig. 4, the pairs of legs are inclined downwardly and outwardly from the frame 10 so that the weight of the frame and table top and work thereon tends to spread the legs whereby said legs will remain in table erected position without other fastening devices.

An upstanding wall 23 extends longitudinally of the table adjacent the rear edge 24 thereof and is suitably secured to the table top 13. The wall 23 has a front surface 25 which is perpendicular to the surface 14 of the table top and adapted to serve as a stop against which boards will be held while being mitered. Since in most work the boards to be sawed will be two inches or less in thickness, it is preferred that the height of the wall 23 from the table top be slightly less than two inches. Adjacent one end of the wall 23 the front portion of said wall is cut away to provide a recess 26 for receiving a movable rip fence 27. In the structure illustrated, the rip fence is of angular cross section with one leg 28 substantially horizontal and the other leg 29 depending therefrom at the forward edge thereof with the lower edge of the leg 29 substantially engaging the surface 14 of the table top. When the fence 27 is positioned in the recess 26 a front face 31 of the leg 29 is in the same plane as the face 25 of the wall 23. The recessed portion of the wall 23 is preferably provided with a rearward extension 32 and the upper faces of the walls 23 and extension 32 are provided with spaced transverse grooves 33 for slidably mounting bars 34 each having one end suitably secured to the rip fence 27 and extending therefrom through the grooves 33. Plates 35 are suitably secured as by fastening devices 36 to the top of the extension 32 to close the upper portion of the grooves 33 therein, and clamp screws 37 have threaded portions screwed into threaded bores 38 in the plates 35 whereby the ends of said threaded screws may be engaged with the bars 34 to clamp same in the grooves 33 to hold the rip fence 27 in selected extended position relative to the wall 23. The end of the table top 13 adjacent the rip fence 27 is preferably provided with linear graduations 39 for determining the distance of the face 31 of the rip fence from the saw disc 4 when used as a circular saw as now to be described.

The table top 13 is provided with a recess 40 having the same peripheral shape and size as the base 6, the recess being arranged whereby when the base is placed therein it will extend longitudinally of and parallel with the rip fence 27, the recess being spaced from the wall 23. The recess 40 has a depth from the surface 14 corresponding to the thickness of the base 6. The table top 13 is provided with an opening 41 having its periphery spaced from the peripheral edge of the recess 40 to provide a flange 42 on which the margins of the base 6 rest to support the saw, the opening 41 being of suitable size whereby the saw 2 can be positioned with the base 6 in the recess 40 and the motor housing 3 and guard 5 below the table top 13 with the saw disc 4 in a plane parallel with the face 31 of the rip fence 27. With the saw so positioned, the rip fence 27 is adjusted to position the face 31 relative to the saw whereby boards may be moved over the table top and the saw operated to rip the boards.

The table top 13 preferably has a rearward extension 43 approximately midway the length of said table top, said extension having an aperture 44 for receiving a pivot pin 45 fixed in a rear end member 46 of a saw supporting guide arm 47. The front portion of the table top is cut on an arc to form a quadrant 48, the curved edge 49 of which is in concentric spaced relation to the pivot pin 45. The upper face of the quadrant adjacent the curved edge 49 thereof is provided with indicia 50 indicating various angular degrees relative to the axis of the pivot pin 45. The saw-supporting guide arm 47 has a front end member 51 movably supported adjacent the curved edge of the quadrant 48. The rear end member 46 and front end member 51 each have upstanding brackets 52 fixed thereon, each bracket having slots 53 extending vertically therein for receiving studs 54 fixed in end members 55 of a guide frame 56. The end members 55 of the guide frame each have ribs 57 slidably engaging the sides of the bracket 52 to maintain the relationship between the frame and the table top surface 14 during vertical adjustment of the frame relative to said table top and front and rear members 46 and 51. Nuts 58 are mounted on the studs 54 for clamping the frame to the brackets in selected adjusted position. The guide frame 56 includes spaced parallel guide rails 59 defining an opening 60 therebetween, the ends of said guide rails 59 being secured to the end members 55 of the guide frame. The guide rails 59 in the illustrated structure are angle members with horizontal flanges 61 and upstanding side flanges 62 at the outer edges of the horizontal flanges, the spacing between the inner surfaces of the upstanding flanges 62 being such that the base 6 of the saw may be slidably supported on the flanges 61 with the side edges of said base substantially engaging the inner surfaces of the flanges 62 whereby said base is substantially retained against lateral movement.

The pivot pin 45 and side flanges 62 are positioned whereby when the saw 2 is placed on the saw supporting guide arm with the base 6 in engagement with the inner faces of the flanges 62, the saw disc 4 will operate in a plane defined by the plane of the disc and the axis of the pin 45 throughout the movement of the saw in the guide arm 47. A pointer 63 (Fig. 6) is secured to the front end member 51 whereby the point is in the plane of the saw disc 4 and is adjacent the indicia 50 on the quadrant 48 to indicate the angle of the plane of the saw disc relative to the front face 25 of the wall 23. The arm 47 may be swung on the pin 45 to move the guide rails 59 in a plane parallel with the table top surface 14 to position the guide arm 47 for various angle cuts in boards on the table top. The arm is held in selected angular position by means of a clamp 64 which includes a bracket 65 suitably secured to the front face of the front end member 51 and extending downwardly therefrom in spaced relation to the edge 49, said bracket having an inturned flange 66 in which is threadedly mounted a clamp screw 67 having an end 68 adapted to be moved into clamping engagement with the under face of the table top adjacent the edge 49 of the quadrant 48, said clamp drawing the front end member 51 tight against the upper face of the marginal portion of the quadrant.

When it is desired to use the saw 2 for rough sawing work, said saw is removed from the table and used independently thereof. When it is desired to make miter cuts in boards, the rip fence 27 is moved until the face 31 is in the plane of the face 25 of the wall 23. Then boards are placed on the table top 14 with one edge in engagement with the face 25 of the wall 23, the clamp screw 67 is loosened, and the guide arm 47 swung on the pin 45 until the pointer 63 is in registry with the desired angle of the miter cut. The clamp screw is then tightened to hold the guide arm in selected angular position. The saw 2 is then placed on the arm with the base 6 supported by the flanges 61 of the rails 59 and said base and saw guard 5 adjusted to position the lower teeth of the saw disc 4 whereby they will barely contact the surface 14. Then the saw 2 is moved in the guide rails of the guide arm 47 toward the wall 23 to make the miter cut. The saw then is withdrawn to the front of the table and the boards removed. If it is desired to cut boards that are thicker than the spacing between the bottom of the guide rails 59 and the surface 14, nuts 58 are loosened at each end of the guide fram 56 and said guide frame raised a suitable distance and the nuts retightened to hold the guide frame in paralel relation to the surface 14 and of sufficient height therefrom to receive the boards to be mitered. The relative position of the base 6 and the guard 5 is again adjusted until the saw blade contacts the surface 14. When it is desired to use the table as a circular saw, a cover 69 having the same peripheral shape as the base 6 and same thickness thereof is removed from the recess 40 and the saw inverted and placed therein whereby the base 6 rests in the recess 40 on the flanges 42. Then the clamp screws 37 are loosened and the rip fence 27 moved relative to the wall 23 until the face 31 of the rip fence aligns with siutable indicia 39 for the desired spacing between the rip fence and the saw disc 4. The boards then are moved on the table top and the saw operated to rip said boards.

It is to be understood that while I have illustrated and described my invention, it is not to be limited to the specific form or arrangement of parts herein described and shown except insofar as such limitations are included in the claims.

What I claim and desire to secure by Letters Patent is:

1. A table for use of an electric portable power saw having a flat base with a saw blade extending through a slot therein and a motor operatively connected to the saw, said table including a top member having a horizontal flat top surface and front and rear longitudinal edges, an upstanding wall fixed on the table top member and extending longitudinally thereof adjacent the rear edge of said top member, a forward extension on the top member intermediate the ends thereof and having an arcuate front edge concentric with an axis on the opposite side of the upstanding wall from said forward extension, said forward extension having a top surface co-planar with the top surface of the top member, a saw supporting guide arm having one end pivotally supported at the axis of the arcuate portion of the table and extending from said axis over the upstanding wall and table top member in spaced relation thereto with the other end of said arm slidably engaging the top surface of the forward extension adjacent the arcuate edge thereof whereby said guide arm is swingable in a plane parallel to the top member, said guide arm having spaced side rails having vertical side flanges and inwardly extending horizontal flanges with the space between the horizontal flanges extending from one arm end to the other, said rails being adapted to slidably support the power saw base on the horizontal flanges between the vertical flanges with the saw blade in the plane of the axis of the pivot of the arm, angular indicia on the arcuate portion, and clamp means on the guide arm operable to clampingly engage the forward extension for securing the guide arm in selected angular position.

2. A table for use of an electric portable power saw having a flat base with a saw blade extending through a slot therein and a motor operatively connected to the saw, said table including a horizontal flat top member, an upstanding wall fixed on the table top member and extending longitudinally thereof adjacent one edge of said top member, an arcuate portion on the other longitudinal edge of the table top member concentric with an axis on the opposite side of the upstanding wall from said arcuate portion, an elongate saw supporting guide arm having depending end members with one end member resting on the table top member and pivotally supported at the axis of the arcuate portion of the table top member and extending from said axis over the upstanding wall and table top member in spaced relation thereto with the other end member of said arm slidably engaging the top member adjacent the arcuate portion thereof for swinging movement of said guide arm in a plane parallel to the top member, said guide arm including a frame having spaced side rails each being in the form of angle members having vertical flanges and inwardly directed horizontal flanges with the space between said horizontal flanges extending between the arm ends whereby said side rails are adapted to slidably support the power saw base with the saw blade in the plane of the axis of the pivot of the arm, means on said guide arm end members adjustably supporting the frame above the top member for vertical movement relative to said top member, angular indicia on the arcuate portion of the top member, and clamp means on sad other end member of the guide arm and engageable with the top member for securing the guide arm in selected angular position.

3. A table for use of an electric portable power saw having a flat base with a saw blade extending through a slot therein and a motor operatively connected to the saw, said table including a top member having a horizontal flat top surface and front and rear longitudinal edges, pairs of legs pivotally mounted on the under side of the top member and swingable from folded positions under the top member to upright positions for supporting the table top member in operative position, an upstanding wall fixed on the table top member and extending longitudinally thereof adjacent the rear edge of said top member, forward and rearward extensions on the top member substantially oppositely disposed and spaced from the ends thereof, said extensions having top surfaces co-planar with the top surface of the top member, said forward extension having an arcuate edge concentric with an axis on the rearward extension at the opposite side of the upstanding wall from said arcuate portion, a saw supporting guide arm having one end member engaging the top surface of the rearward extension and pivotally supported thereon at the axis of said arcuate edge of the forward extension of the table top member and extending from said axis over the upstanding wall and table top member in spaced relation thereto with the other end member of said arm slidably engaging the top surface of said forward extension adjacent the arcuate edge thereof whereby said guide arm is swingable in a plane parallel to the top member, said guide arm including a frame having spaced side rails with the space extending between the arm end members and adapted to slidably support the power saw base with the saw blade in the plane of the axis of the pivot of the arm, means on the arm end members adjustably supporting the frame above the top member for vertical movement relative to said top member, angular indicia on the forward extension of the top member adjacent the arcuate edge thereof, an indicator on said other end member of the guide arm in the plane of the saw blade and arm pivot axis registrable with the indicia to indicate the angular relationship of the guide arm and upstanding wall, and interengaging means on the guide arm and forward extension for securing the guide arm in selected angular position.

References Cited in the file of this patent

UNITED STATES PATENTS

| | | |
|---|---|---|
| 292,350 | Pfaendler | Jan. 22, 1884 |
| 1,457,492 | Bloodgood | June 5, 1923 |
| 1,618,341 | Howland | Feb. 22, 1927 |
| 1,832,283 | Earhart | Nov. 17, 1931 |
| 1,842,630 | Rodning | Jan. 26, 1932 |
| 2,595,322 | Avery | May 6, 1952 |
| 2,612,914 | Reynolds | Oct. 7, 1952 |
| 2,630,146 | Van Tuyl | Mar. 3, 1953 |
| 2,633,162 | Neuenschwander | Mar. 31, 1953 |
| 2,708,463 | Coleman | May 17, 1955 |
| 2,765,820 | Perkins | Oct. 9, 1956 |
| 2,767,747 | Burrows | Oct. 23, 1956 |

FOREIGN PATENTS

| | | |
|---|---|---|
| 34,547 | Sweden | Mar. 26, 1913 |